(12) United States Patent
Takamizu et al.

(10) Patent No.: US 7,370,913 B2
(45) Date of Patent: May 13, 2008

(54) LOCKING MECHANISM OF CHILD CAR SEAT AND CHILD CAR SEAT SECURING APPARATUS OF STROLLER

(75) Inventors: Nobuaki Takamizu, Saitama (JP); Katsuhiro Iwata, Saitama (JP)

(73) Assignee: Combi Corporation, Tokyo (JP)

( * ) Notice: Subject to any disclaimer, the term of this patent is extended or adjusted under 35 U.S.C. 154(b) by 158 days.

(21) Appl. No.: 11/059,537

(22) Filed: Feb. 17, 2005

(65) Prior Publication Data

US 2005/0184564 A1  Aug. 25, 2005

(30) Foreign Application Priority Data

| Feb. 19, 2004 | (JP) | ............................. 2004-042911 |
| Feb. 19, 2004 | (JP) | ............................. 2004-043051 |
| Mar. 5, 2004  | (JP) | ............................. 2004-062885 |

(51) Int. Cl.
*A47D 1/10* (2006.01)
(52) U.S. Cl. ............................. 297/256.16; 297/256.17
(58) Field of Classification Search ............. 297/250.1, 297/256.16, 256.17, 463.1
See application file for complete search history.

(56) References Cited

U.S. PATENT DOCUMENTS

| 5,567,008 | A | 10/1996 | Cone, II |
| 5,676,386 | A * | 10/1997 | Huang .......................... 280/30 |
| 5,947,555 | A * | 9/1999 | Welsh et al. ................. 297/130 |
| 6,695,400 | B2 * | 2/2004 | Washizuka et al. ......... 297/130 |
| 6,793,280 | B2 * | 9/2004 | Washizuka et al. ......... 297/130 |
| 6,942,294 | B2 * | 9/2005 | Takamizu .............. 297/256.16 |

FOREIGN PATENT DOCUMENTS

| DE | 3626298 C1 | 12/1987 |
| EP | 0467398 A1 | 1/1992 |
| EP | 1029768 A1 | 8/2000 |
| EP | 1211124 A1 | 6/2002 |
| JP | 2002-205586 A | 7/2002 |

* cited by examiner

*Primary Examiner*—Joe Edell
(74) *Attorney, Agent, or Firm*—Birch, Stewart, Kolasch & Birch, LLP (57) ABSTRACT

A locking mechanism of a child car seat includes a locking member which is capable of being engaged with a pin disposed in an armrest of a stroller body and disengaged therefrom, a stopper which is rotated together with the locking member, and a stopper unlocking member having an engagement portion capable of being engaged with a stopper staged part of the stopper and disengaged therefrom. In order to detach the child car seat from the stroller body, an unlocked state of the locking mechanism is maintained. The engagement portion of the stopper unlocking member has an inclined surface which is inclined away from the stopper staged part.

6 Claims, 9 Drawing Sheets

LOCKING MECHANISM OF CHILD CAR SEAT AND CHILD CAR SEAT SECURING APPARATUS OF STROLLER

BACKGROUND OF THE INVENTION

1. Field of the Invention

The present invention relates to a locking mechanism of a child car seat and a child car seat securing apparatus of a stroller.

2. Background Art

A child car seat is generally used in an automobile for a baby under one year of age. Such a child car seat can be detachably attached on a car seat. A child car seat has been proposed, which can be used, when detached from a car seat, as a carrier for carrying a baby lying thereon, and as a seat for a stroller by attaching the child car seat on a stroller body.

A conventional child car seat is disclosed in Japanese Patent Laid-Open Publication No. 2002-205586.

A child car seat attached on a stroller body is detached therefrom by operating a detachment lever. In order to facilitate the attachment and detachment operations of a child car seat by means of a detachment lever, a detachment lever has been proposed that is formed such that an unlocked state thereof can be maintained after a user rotates the detachment lever to an unlocked position and removes his/her hands therefrom. However, after the child car seat is detached from a stroller body, the detachment lever at the unlocked position cannot be returned to the locked position. When the detachment lever is forcibly operated to return the lever to the locked position, the detachment lever might break up. Thus, it has been proposed to separately dispose an unlocking lever. However, the detachment lever might break up when the detachment lever is wrongly operated.

SUMMARY OF THE INVENTION

An object of the present invention is to provide a locking mechanism of a child car seat and a child car seat securing apparatus of a stroller, which make it possible for a detachment lever to be securely maintained at an unlocked position, after a user rotates the detachment lever to the unlocked position and removes his/her hands therefrom so as to detach a child car seat from a stroller body. Thereafter the detachment lever can be easily returned to a locked position.

The present invention is a locking mechanism provided on a child car seat which is attached on a stroller body including an armrest having therein a pin, comprising: a locking member which is rotatably disposed on the child car seat, and is capable of being engaged with the pin disposed in the armrest of the stroller body and disengaged therefrom; a stopper which is rotated together with the locking member, and has a stopper staged part; and a stopper unlocking member having an engagement projection capable of being engaged with the stopper staged part of the stopper and disengaged therefrom; wherein the locking member can take a locked position and an unlocked position, the stopper staged part and the engagement projection are engaged with each other to maintain the locking member at the unlocked position, when the child car seat is detached from the stroller body, and one of the stopper staged part and the engagement projection has an inclined surface which is inclined in a direction away from the other, when the stopper staged part and the engagement projection are engaged with each other.

In the locking mechanism of a child car seat, the locking member and the stopper may be coaxially rotated relative to the child car seat, and the stopper unlocking member may be arranged in coplanar relationship with the stopper, and is rotatably disposed on the child car seat.

In the locking mechanism of a child car seat, the locking member and the stopper may be integrally formed with each other, and the stopper unlocking member may be arranged in coplanar relationship with the stopper, and is rotatably disposed on the child car seat.

In the locking mechanism of a child car seat, a spring may be interposed between the stopper and the stopper unlocking member, for urging the stopper and the stopper unlocking member to come close to each other.

In the locking mechanism of a child car seat, the engagement projection of the stopper unlocking member may have an inclined surface which is inclined in a direction away from the stopper staged part, when the stopper staged part and the engagement projection are engaged with each other.

In the locking mechanism of a child car seat, the stopper staged part of the stopper may have an inclined surface which is inclined in a direction away from the engagement projection, when the stopper staged part and the engagement projection are engaged with each other.

The present invention is a locking mechanism provided on a child car seat which is attached on a stroller body including an armrest having therein a pin, comprising: a locking member which is rotatably disposed on the child car seat, and is capable of being engaged with the pin disposed in the armrest of the stroller body and disengaged therefrom; a stopper which is rotated together with the locking member, and has a stopper staged part; a stopper unlocking member having an engagement projection capable of being engaged with the stopper staged part of the stopper and disengaged therefrom; a detachment lever for rotating the locking member and the stopper simultaneously from a locked position to an unlocked position; and a second locking mechanism disposed on the child car seat, for restricting a movement of the detachment lever; wherein the stopper staged part and the engagement projection are engaged with each other to maintain the locking member and the stopper at the unlocked position, when the child car seat is detached from the stroller body.

In the locking mechanism of a child car seat, the second locking mechanism may have a locking button which is capable of being pushed, and is disposed in an operation region of the detachment lever.

In the locking mechanism of a child car seat, the locking member may be disposed on the detachment lever such that the locking member can be rotated at an angle enabling the locking member to be disengaged from the pin disposed in the armrest.

In the locking mechanism of a child car seat, the detachment lever may be disposed on the locking member through a stopper shaft, the stopper shaft may be inserted to a hole formed in the locking member, the hole of the locking member having a shape of scalloping allowing the locking member to be rotated relative to the stopper shaft only in the unlocked direction.

The present invention is a child car seat securing apparatus of a stroller, which is provided on an armrest of a stroller body on which a child car seat having a locking mechanism is attached, comprising: a pin disposed in the armrest to be engaged with the locking mechanism; and an enclosure fixed on the armrest, for holding therein the pin.

In the child car seat securing apparatus of a stroller, the armrest may have an elongated opening through which a locking mechanism is inserted, and the enclosure may have an upper opening corresponding to the elongated opening of the armrest.

In the child car seat securing apparatus of a stroller, the enclosure may have a flange portion disposed at a periphery of the upper opening, the flange portion being secured on the inner surface of the armrest.

In the child car seat securing apparatus of a stroller, the flange portion may be secured on the inner surface of the armrest by a screw.

According to the present invention, when the detachment lever is rotated to the unlocked position so as to detach the child car seat from the stroller body, the detachment lever can be maintained at the unlocked position after a user removes his/her hands from the detachment lever. After the child car seat is detached from the stroller body, the detachment lever can be easily returned from the unlocked position to the locked position. Thus, breakage of the detachment lever can be securely prevented.

According to the present invention, when the detachment lever is rotated to the unlocked position so as to detach the child car seat from the stroller body, the detachment lever can be maintained at the unlocked position after a user removes his/her hands from the detachment lever. During a use of the child car seat on the stroller body, the locking member can be prevented from being rotated in the unlocked direction, which may be caused by a wrong operation of the detachment lever. The locking mechanism can have an improved operability in that it is unnecessary to unlock the second locking mechanism each time the child car seat is attached on the stroller body.

According to the present invention, the size of the child car seat needs not be enlarged. In addition, since the pin for securing the child car seat on the stroller body is not exposed outside the armrest, an attractive appearance of the stroller body can be provided.

DETAILED DESCRIPTION OF THE INVENTION

First Embodiment

Figure 9:
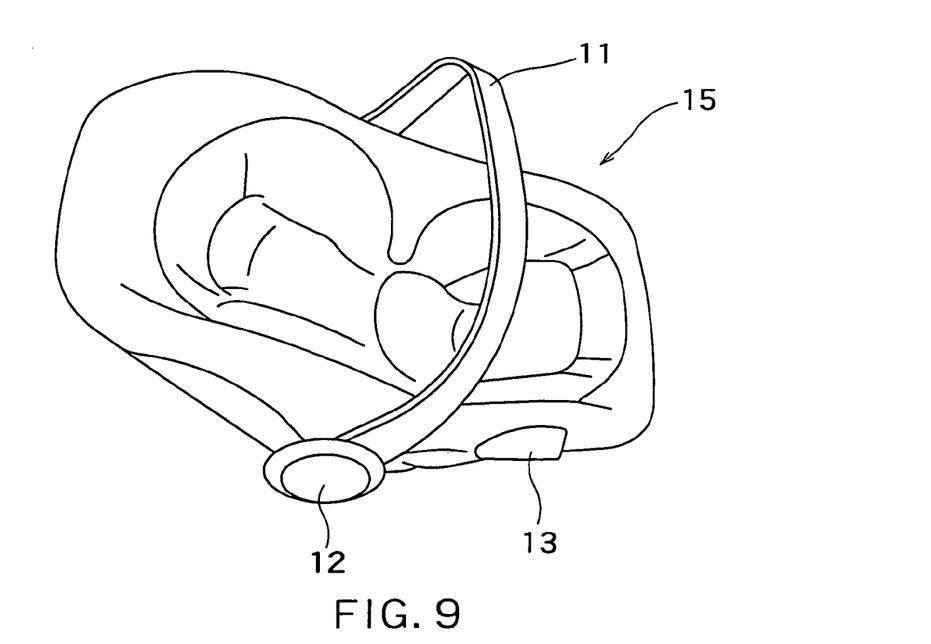
FIG. 9 is a schematic perspective view of a child car seat.
Figure 10:
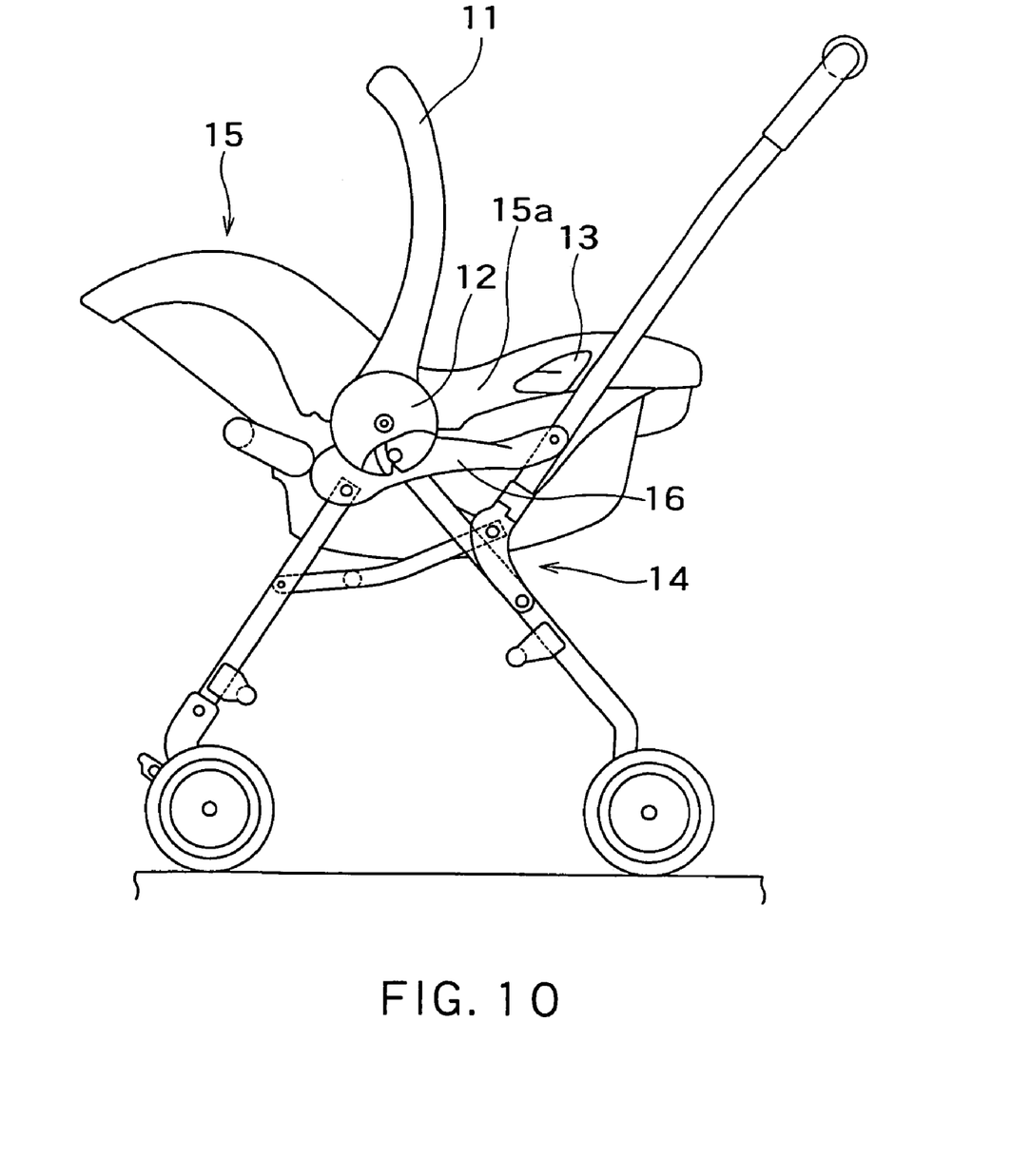
FIG. 10 is a view showing the child car seat attached on a stroller body.

FIGS. 9 and 10 show a child car seat attached on a stroller body.

FIG. 9 is a perspective view of a child car seat 15 which can be attached on a stroller body 14 including an armrest 16. The child car seat 15 includes a swingable handle 11 of an inverted U-shape which also serves as a member on which a hood is disposed. A handle receiving section 12 is disposed on both sides of the child car seat 15. The handle 11 is swingably disposed on the child car seat 15, with ends of the handle 11 being inserted to the respective handle receiving sections 12. The child car seat 15 includes a hook-shaped belt guide 13 projecting rearward. As shown in FIG. 10, the child car seat 15 can be detachably attached on the armrest 16 of the stroller body 14. The child car seat 15 capable of being detachably attached on the stroller body 14 includes a locking mechanism 20 for securing the child car seat 15 to the armrest 16 of the stroller body 14.

The locking mechanism 20 is described below in detail with reference to FIGS. 1 to 8.

Figure 1:
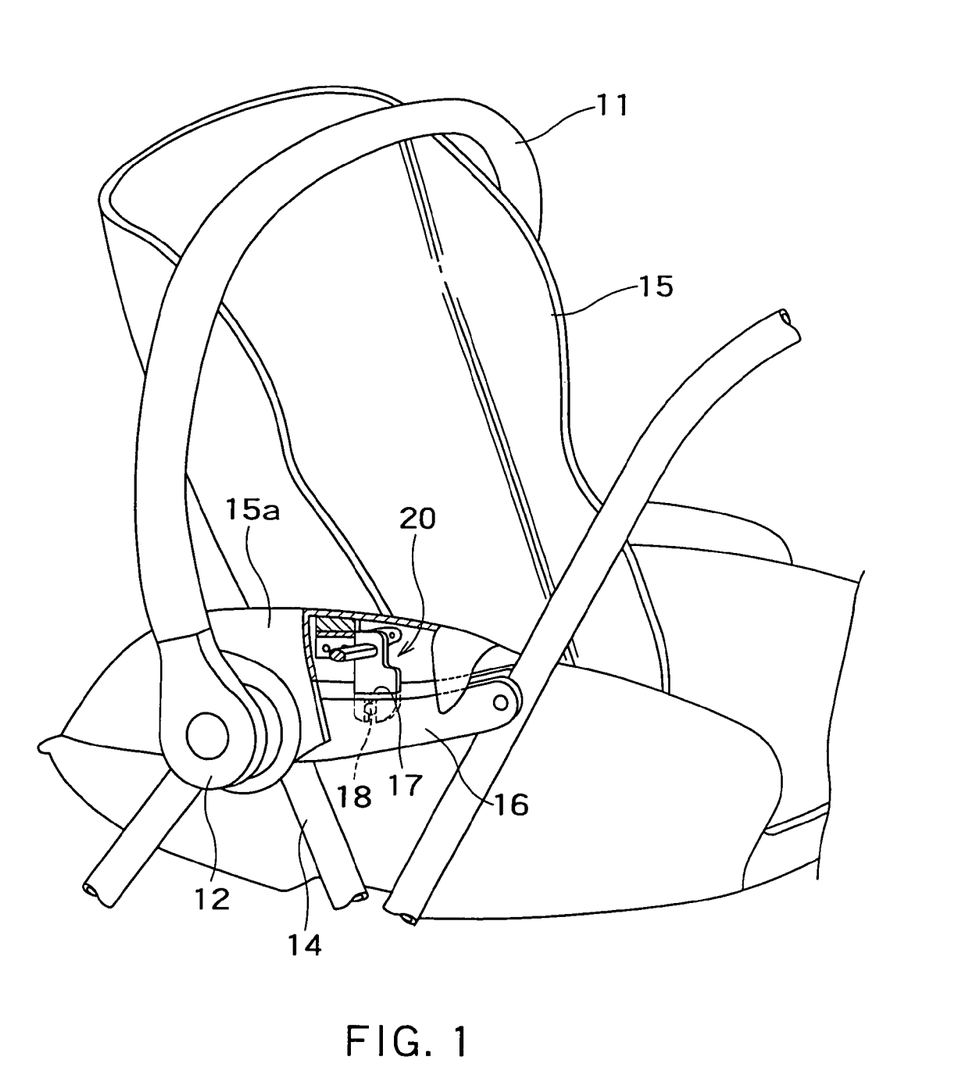
FIG. 1 is a partial cut-away perspective view of a child car seat in a first embodiment of the present invention, which is attached on a stroller body.

FIG. 1 is a view showing the child car seat 15 according to the present invention which is attached on the stroller body 14. An engagement section 15a having an inverted U-shape cross-section is disposed on both sides of the child car seat 15. The engagement section 15a is engaged with the armrest 16 of the stroller body 14. The locking mechanism 20, which is described below, is disposed in the engagement section 15a. The armrest 16 has a narrow elongated opening 17 on its upper surface. A pin 18 extending in a right and left direction of a stroller is disposed in the armrest 16. The locking mechanism 20, which is inserted to the armrest 16 through the elongated opening 17 from above, can be engaged with the pin 18.

A function of the pin 18 is to secure the child car seat 15 to the stroller body 14.

Figure 2:
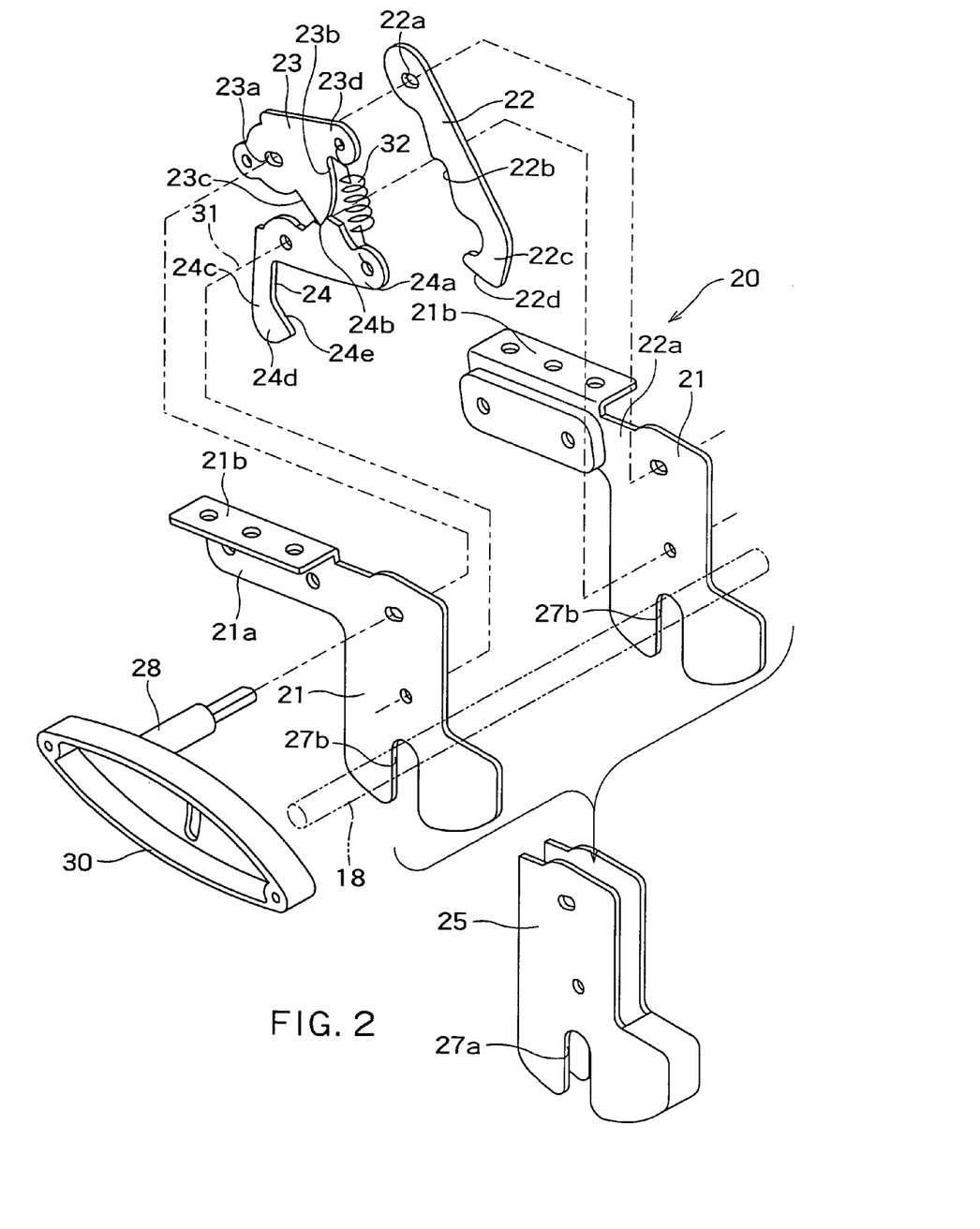
FIG. 2 is an exploded perspective view of a locking mechanism.

FIG. 2 is an exploded perspective view of the locking mechanism 20. The locking mechanism 20 includes right and left frame plates 21 and 21, a locking member 22 made of a plate disposed between the right and left frame plates 21 and 21, a stopper 23 disposed on one side of the locking member 22, and a stopper unlocking member 24 disposed in coplanar relationship with the stopper 23. The locking member 22, the stopper 23, and the stopper unlocking member 24, which are arranged between the right and left frame plates 21 and 21, are disposed in a protective member 25 made of plastic. The protective member 25 prevents the elongated opening 17 of the armrest 16 from being damaged when the locking mechanism 20 is inserted in the armrest 16 and/or withdrawn therefrom.

The protective member 25 has cutout portions 27a, while the right and left frame plates 21 respectively have cutout portions 27b. A lower end of each of the cutout portions 27a and 27b is opened, so that the cutout portions 27a and 27b can be engaged with the pin 18 disposed in the armrest 16. Each of the frame plates 21 has an arm 21a projecting rearward. An angle member 21b is disposed on the arm 21a. The protective member 25 and the frame plates 21 are secured on an inner upper surface of the engagement section 15a of the child car seat 15 through the angle members 21b.

A stopper shaft 28 is rotatably inserted through the protective member 25 and the frame plates 21. The locking member 22 and the stopper 23 are secured on the stopper shaft 28. That is, the stopper shaft 28 has a rectangular cross-section, and the locking member 22 and the stopper 23 respectively have holes 22a and 23a whose shapes are correspondent to the rectangular cross-section of the stopper shaft 28. Thus, by fitting the stopper shaft 28 in the holes 22a and 23a, the locking member 22 and the stopper 23 can be simultaneously rotated together with the stopper shaft 28. An end of the stopper shaft 28 projects outward from a side surface of the engagement section 15a of the child car seat 15. A detachment lever 30 is fixed on the projected end of the stopper shaft 28. A stopper unlocking member 24 is rotatably disposed on a shaft 31 passing through the protective member 25 and the frame plates 21. The detachment lever 30 rotates the locking member 22 and the stopper 23 simultaneously from a locked position to an unlocked position, which is described in detail below.

The locking member 22 has a recessed portion 22b at a center thereof, and a locking claw 22c at a lower end thereof. The recessed portion 22b is capable of being engaged with the shaft 31. The locking claw 22c is capable of being engaged with the pin 18. A guide surface 22d is formed on a lower end edge of the locking claw 22c, which is inclined upward toward a rear end of the locking claw 22c.

The stopper 23 has at an end thereof an arc 23b. The center of the arc 23b corresponds to an axis of the hole 23a. A stopper staged part 23c radially extending from the arc 23b to the axis of the hole 23a is formed on one end of the arc 23b. The stopper unlocking member 24 formed in an inverted L-shape is secured on the shaft 31 at a center part thereof. The stopper unlocking member 24 has a horizontal arm 24a, and an engagement projection 24b projected from a center part of the horizontal arm 24a. The engagement projection 24b is capable of being engaged with the stopper staged part 23c. The stopper unlocking member 24 further has an arm 24c extending downward. A stopper unlocking operation part 24d is formed at a lower end of the arm 24c. The stopper unlocking operation part 24d is capable of being engaged with the pin 18 from the opposite side of the locking claw 22c of the locking member 22. An inclined part 24e inclined downward is formed at an upper periphery of the stopper unlocking operation part 24d. A spring 32 is interposed between an end of a horizontal arm 23d of the stopper 23 and an end of the horizontal arm 24a of the stopper unlocking member 24. The stopper 23 and the stopper unlocking member 24 are urged in a tensile direction by the spring 32.

Figure 3:
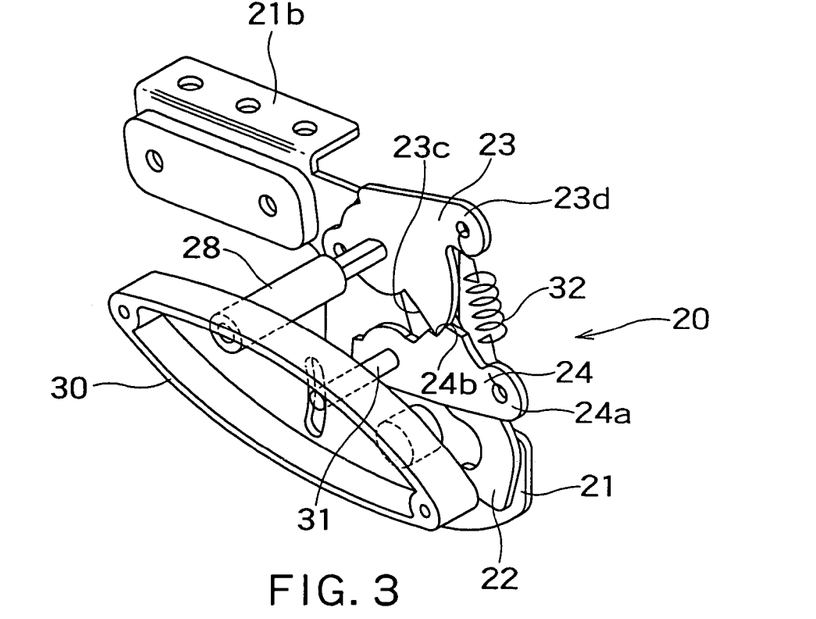
FIG. 3 is a schematic view of the locking mechanism.

FIG. 3 is a perspective view of the respective pieces shown in FIG. 2 which are combined to form the locking mechanism 20, with one of the frame plates 21 being omitted.

Figure 4:
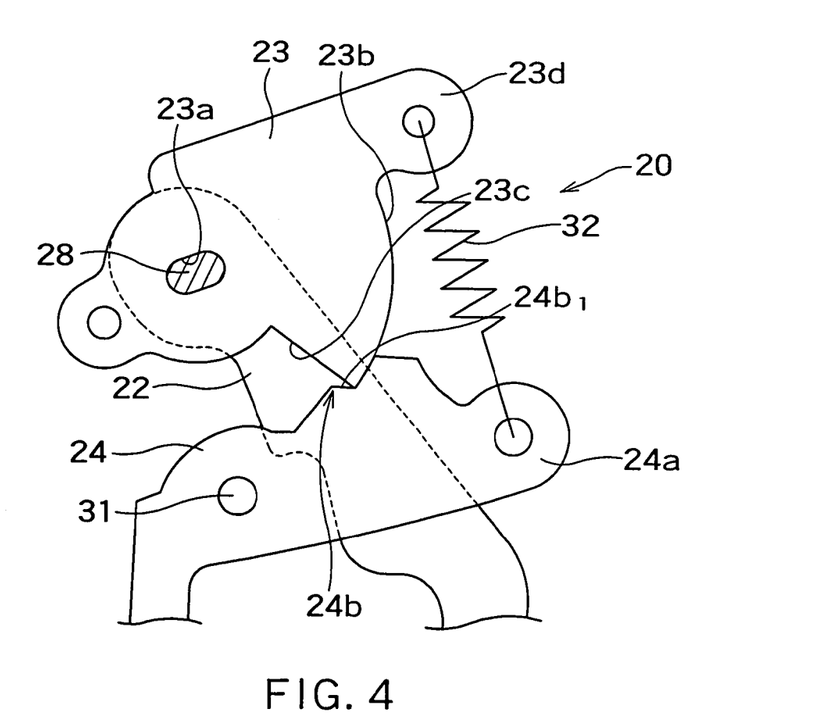
FIG. 4 is an enlarged view of an engagement of a stopper and a stopper unlocking member of the locking mechanism.
Figure 5:
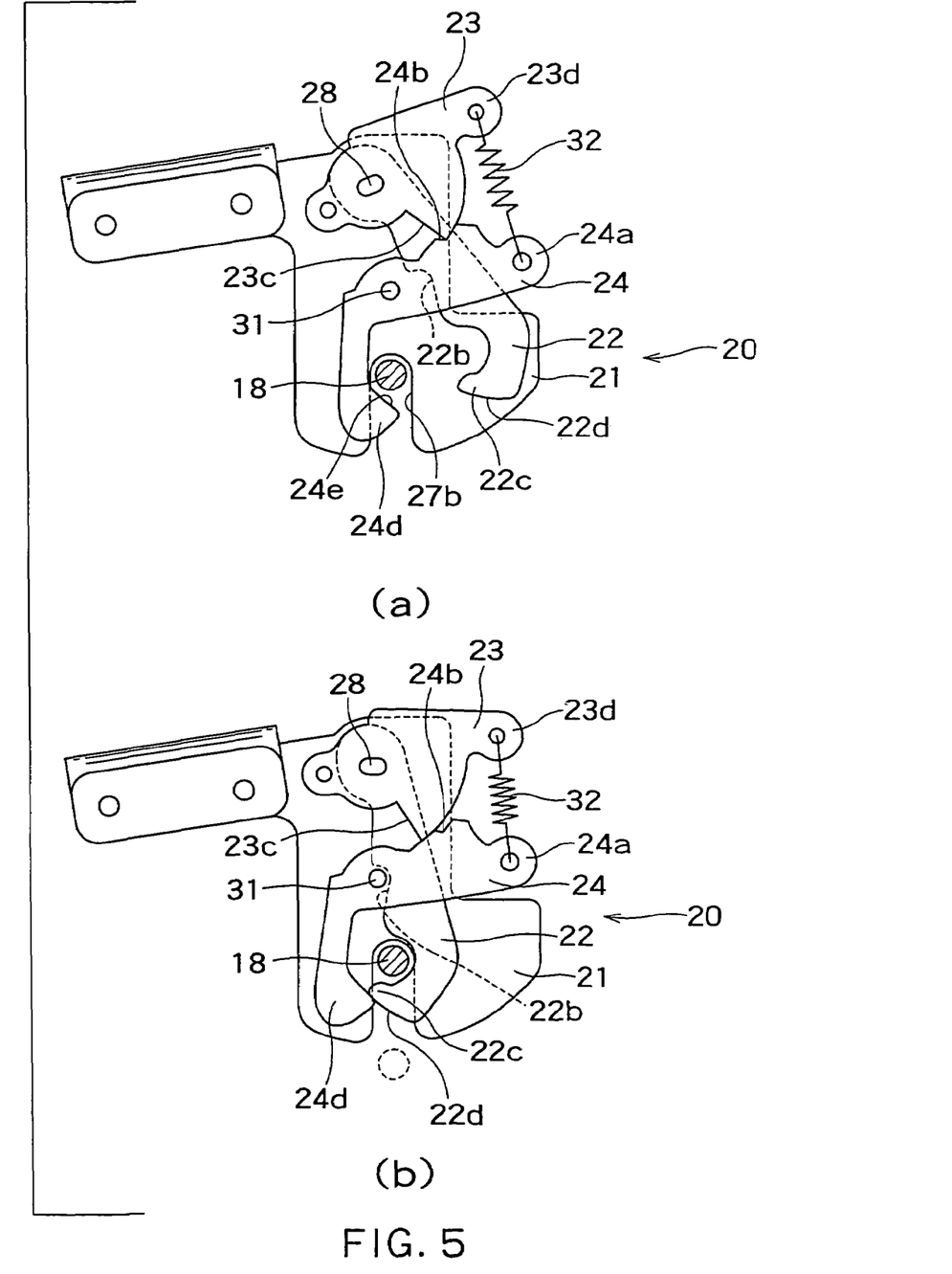
FIG. 5(a) is a view showing an operation of the locking mechanism.
FIG. 5(b) is a view showing an operation of the locking mechanism.

FIG. 4 is an enlarged view showing an engagement of the stopper staged part 23c of the stopper 23 and the engagement projection 24b of the stopper unlocking member 24. The engagement projection 24b of the stopper unlocking member 24 has an inclined part which is opposed to the stopper staged part 23c. More particularly, the part, which is opposed to the stopper staged part 23c, of the engagement projection 24b of the stopper unlocking member 24 has an inclined surface $24b_1$ that is inclined in a direction away from the stopper staged part 23c, when the engagement projection 24b is engaged with the stopper staged part 23c.

In order to attach the child car seat 15 on the stroller body 14, a lower part of the child car seat 15 is firstly inserted between the right and left armrests 16, such that the locking mechanisms 20 provided on both sides of the child car seat 15 are respectively inserted from above into the armrests 16 through the elongated openings 17 thereof. As the child car seat 15 is moved downward, the cutout portions 27a of the protective member 25 and the cutout portions 27b of the frame plates 21 are fitted to the pin 18 disposed in the armrest 16. Then, the guide surface 22d of the locking member 22 is brought into contact with the pin 18. By means of the guide surface 22d, the locking member 22 is rotated together with the stopper 23 in opposition to a spring force of the spring 32 in a counterclockwise direction in FIG. 5(a). Then, the locking claw 22c is moved away from the cutout portions 27a and 27b, and the cutout portions 27b of the frame plates 21 are engaged with the pin 18 disposed in the armrest 16.

After the cutout portions 27b of the frame plates 21 are engaged with the pin 18, the locking member 22 together with the stopper 23 is rotated clockwise by means of a spring force of the spring 32. Then, the recessed portion 22b is engaged with the shaft 31, and the locking claw 22c is engaged with a lower part of the pin 18. Finally, the stopper unlocking operation part 24d of the stopper unlocking member 24 is engaged with the lower part of the pin 18. In this manner, the child car seat 15 is locked in position (FIG. 5(b)).

On the other hand, in order to detach the child car seat 15 from the stroller body 14, the detachment lever 30 is firstly rotated counterclockwise in FIG. 3. Then, the locking member 22 is rotated counterclockwise, so that the locking claw 22c is moved to the unlocked position shown in FIG. 5(a). Simultaneously with the rotation of the locking member 22 to the unlocked position, the stopper 23 is rotated counterclockwise about the stopper shaft 28, and the stopper unlocking member 24 is rotated counterclockwise by means of a spring force of the spring 32. Then, the engagement projection 24b of the stopper unlocking member 24 is engaged with the stopper staged part 23c of the stopper 23, whereby a further rotation of the locking member 22 is prevented. Thus, the locking member 22 is automatically fixed at the unlocked position.

In this manner, after a user rotates the detachment lever 30 to the unlocked position and removes his/her hands therefrom, the locking member 22 can be fixed at the unlocked position. Thereafter, simply by moving up the child car seat 15 from the stroller body 14, the child car seat 15 can be detached therefrom.

In the course of moving the child car seat 15 upward, the inclined part 24e of the stopper unlocking operation part 24d is brought into contact with the pin 18, so that the stopper unlocking member 24 is rotated clockwise about the shaft 31 in opposition to a spring force of the spring 32. Then, the engagement projection 24b is disengaged from the stopper staged part 23c, and thus the locking member 22 is no more fixed at the unlocked position. Therefore, the locking member 22 together with the stopper 23 can be automatically returned from the unlocked position to the locked position shown in FIG. 5(b) by means of a spring force of the spring 32.

As described above, by rotating the detachment lever 30 to the unlocked position, the locking member 22 is automatically fixed at the unlocked position, and the detachment lever 30 is also fixed at the operated position.

When the child car seat 15 is used separately from the stroller body 14, if the detachment lever 30 is rotated to the unlocked position and fixed thereat, the detachment lever 30 might not be returned from the unlocked position to the locked position. In this case, if the detachment lever 30 is forcibly operated to return to the locked position, the detachment lever 30 might break up.

In order to avoid such a disadvantage, however, in the present invention, the part, which is opposed to the stopper staged part 23c, of the engagement projection 24b of the stopper unlocking member 24 has the inclined surface $24b_1$ that is inclined in a direction away from the stopper staged part 23c, when the engagement projection 24b is engaged with the stopper staged part 23c. Therefore, when the child car seat 15 is used separately from the stroller body 14, although the detachment lever 30 is rotated to the unlocked position and fixed thereat, it is possible to return the detachment lever 30 to the locked position by rotating the detachment lever 30 to the locked position. This is because the stopper staged part 23c of the stopper 23 can slide along the inclined surface $24b_1$ of the engagement projection 24b of the stopper unlocking member 24. Therefore, the stopper 23 and the detachment lever 30 can be returned from the unlocked position to the locked position without any trouble. As a result, the detachment lever 30 can be prevented from breaking up.

An inclined angle formed between the inclined surface $24b_1$ and the stopper staged part 23c may be suitably determined based on a correlation of a degree of the inclined angle and a spring force of the spring 32. When a spring force of the spring 32 is increased to strengthen an operation force of the detachment lever 30, the inclined angle is enlarged to correspond thereto. Since the stopper 23 and the stopper unlocking member 24 are urged to come close to each other only by the spring 32, the stopper 23 and the stopper unlocking member 24 can be securely maintained at the unlocked position, irrespective of the degree of the inclined angle.

Figure 6:
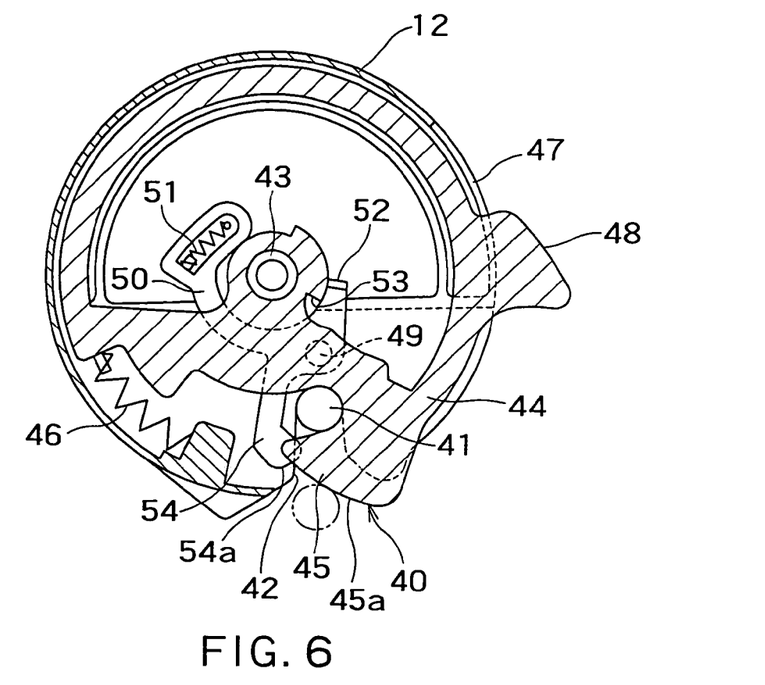
FIG. 6 is a view showing a locking mechanism in another embodiment of the present invention which is locked.
Figure 7:
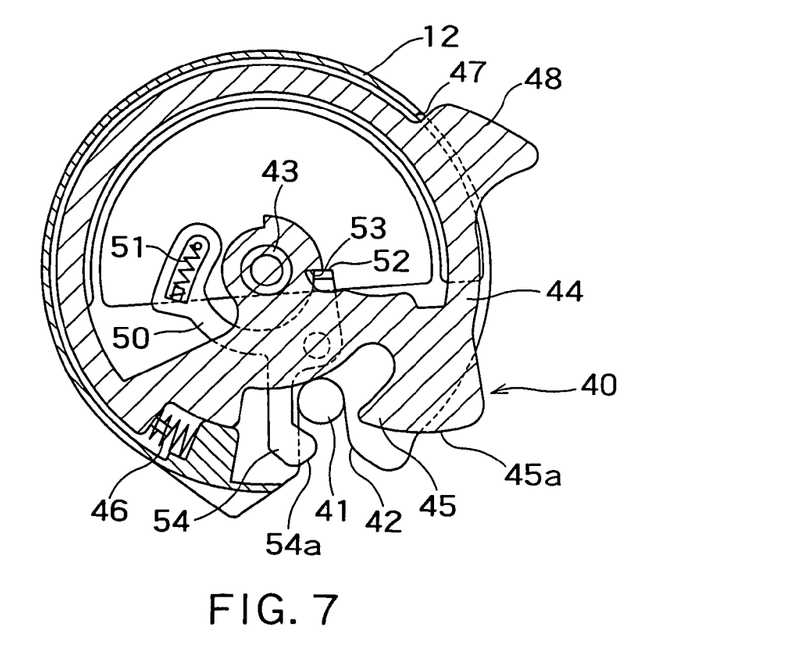
FIG. 7 is a view showing the locking mechanism in another embodiment of the present invention which is unlocked.

FIGS. 6 and 7 are cross-sectional views showing a locking mechanism in another embodiment of the present invention. A locking mechanism 40 disposed in a handle receiving section 12 is engaged with a boss projected from each of right and left armrests 16 of a stroller body 14.

FIGS. 6 and 7 are cross-sectional views showing a constitution of the locking mechanism 40. The handle receiving section 12 includes an upwardly extending cutout portion 42 formed in a side surface on a side of a child car seat 15. The cutout portion 42 is capable of being engaged with a boss (or a pin) 41 projected from the armrest 16. In the handle receiving section 12, there is provided a locking member 44 rotatably disposed on a shaft 43 projected from the child car seat 15.

The locking member 44 has a locking claw 45 formed integrally therewith. By a rotation of the locking member 44, the locking claw 45 is engaged with a lower part of the boss 41 positioned in the cutout portion 42. A guide surface 45a is formed on a lower surface of the locking claw 45, for rotating the locking member 44 in an unlocked direction when the lower surface of the locking claw 45 is brought into contact with the boss 41. The locking claw 45 of the locking member 44 is urged by a spring 46 in a locked direction. A detachment lever 48 is disposed on a part of an outer periphery of the locking member 44. The detachment lever 48 projects outward the handle receiving section 12 through a slit 47 formed therein which is extended in a circumferential direction of the handle receiving section 12.

In the handle receiving section 12, a shaft 49 is eccentrically disposed relative to the shaft 43 on which the locking member 44 is disposed. A stopper unlocking member 50, which is rotatably supported by the shaft 49, is constantly urged by a spring 51 in a direction opposite to the locking member 44. The stopper unlocking member 50 has an engagement piece 52. When the locking member 44 is rotated at the unlocked position, the engagement piece 52 is engaged with a stopper staged part 53 of the locking member 44, whereby the locking member 44 is automatically fixed at the unlocked position (FIG. 7).

Figure 8:
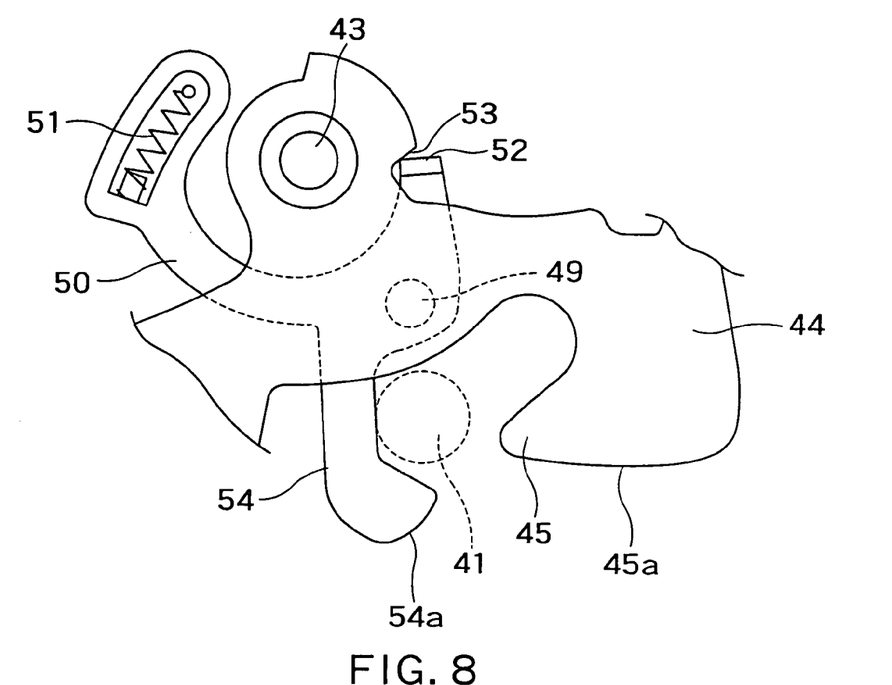
FIG. 8 is a partially enlarged view of the locking mechanism shown in FIG. 6.

FIG. 8 is an enlarged view showing an engagement of the engagement piece 52 of the stopper unlocking member 50 and the locking member 44. The stopper staged part 53, which is opposed to the engagement piece 52, of the locking member 44 is inclined. More particularly, a part, which is opposed to the engagement piece 52, of the stopper staged part 53 provides an inclined surface 53 that is inclined in a direction away from the engagement piece 52, when the stopper staged part 53 is engaged with the engagement piece 52.

The stopper unlocking member 50 has a downwardly extending stopper unlocking rod 54 which has an unlocking operation part 54a on a lower end thereof. When the unlocking operation part 54a is brought into contact with the boss 41, the stopper unlocking member 50 is rotated counterclockwise in opposition to a spring force of the spring 51, so that the engagement piece 52 is disengaged from the stopper staged part 53.

In order to attach the child car seat 15 on the stroller body 14, as shown in FIG. 6, a lower part of the child car seat 15 is inserted between the right and left armrests 16 of the expanded stroller body 14 from above, such that the right and left handle receiving sections 12 of the child car seat 15 are engaged with upper outside parts of the armrests 16. As the child car seat 15 is moved downward, the guide surface 45a of the locking member 44 is brought into contact with the boss (or a pin) 41 of the stroller body 14. By means of the guide surface 45a, the locking member 44 is rotated in opposition to a spring force of the spring 46 in a counterclockwise direction in FIG. 6. Thus, the locking claw 45 is rotated away from the cutout portion 42 of the handle receiving section 12, so that the cutout portion 42 is engaged with the boss 41.

After the cutout portion 42 of the handle receiving section 12 is engaged with the boss 41, the locking member 44 is rotated clockwise in FIG. 6 by means of a spring force of the spring 46, so that the locking claw 45 is engaged with a lower part of the boss 41. In this manner, the child car seat 15 is locked in position, with the handle receiving section 12 being mounted on the armrest 16. Thus, the child car seat 15 fixedly attached on the stroller body 14 can be used as a stroller.

On the other hand, in order to detach the child car seat 15 from the stroller body 14, the detachment lever 48 is firstly rotated upward as shown in FIG. 7. Then, the locking member 44 is rotated counterclockwise so that the locking claw 45 is moved to the unlocked position. When the locking member 44 is rotated to the unlocked position, the stopper unlocking member 50 is rotated counterclockwise about the shaft 49 by means of a spring force of the spring 51. Then, the engagement piece 52 is engaged with the stopper staged part 53 of the locking member 44 to prevent a further rotation of the locking member 44. As a result, the locking member 44 can be automatically fixed at the unlocked position.

Thereafter, by moving up the child car seat 15 from the stroller body 14, the child car seat 15 can be detached therefrom. In the course of moving the child car seat 15 upward, the unlocking operation part 54a is brought into contact with the boss 41, and the stopper unlocking member 50 is rotated counterclockwise about the shaft 49 in opposition to a spring force of the spring 51. Then, the engagement piece 52 is disengaged from the stopper staged part 53, and thus the locking member 44 is no more fixed at the unlocked position. Therefore, the locking member 44 can be automatically returned from the unlocked position to the locked position shown in FIG. 6 by means of a spring force of the spring 46.

As described above, by rotating the detachment lever 48 to the unlocked position, the locking member 44 is automatically fixed at the unlocked position, and the detachment lever 48 is also fixed at the operated position.

When the child car seat 15 is separately from the stroller body 14, if the detachment lever 48 is rotated to the unlocked position and fixed thereat, the detachment lever 48 might not be returned from the unlocked position to the locked position. In this case, if the detachment lever 48 is forcibly operated to return to the locked position, the locking member 44 might break up.

In order to avoid such a disadvantage, however, in the present invention, the part, which is opposed to the engagement piece 52, of the stopper staged part 53 has the inclined surface that is inclined in a direction away from the engagement piece 52, when the stopper staged part 53 is engaged with the engagement piece 52. Therefore, when the child car seat 15 is used separately from the stroller body 14, although the detachment lever 48 is rotated to the unlocked position and fixed thereat, it is possible to return the detachment lever 48 to the locked position by rotating the detachment lever 48 to the locked position. This is because the inclined surface of the stopper staged part 53 can slide along the engagement piece 52. Therefore, the locking member 44 and the detachment lever 48 can be returned from the unlocked position to the locked position without any trouble. As a result, the locking member 44 can be prevented from breaking up. An inclined angle of the inclined surface of the stopper staged part 53 may be suitably determined based on a correlation of a degree of the inclined angle and the spring forces of the spring 46 and 51.

Second Embodiment

A locking mechanism in a second embodiment of the present invention will be described below with reference to FIGS. 11 and 12.

Figure 11:
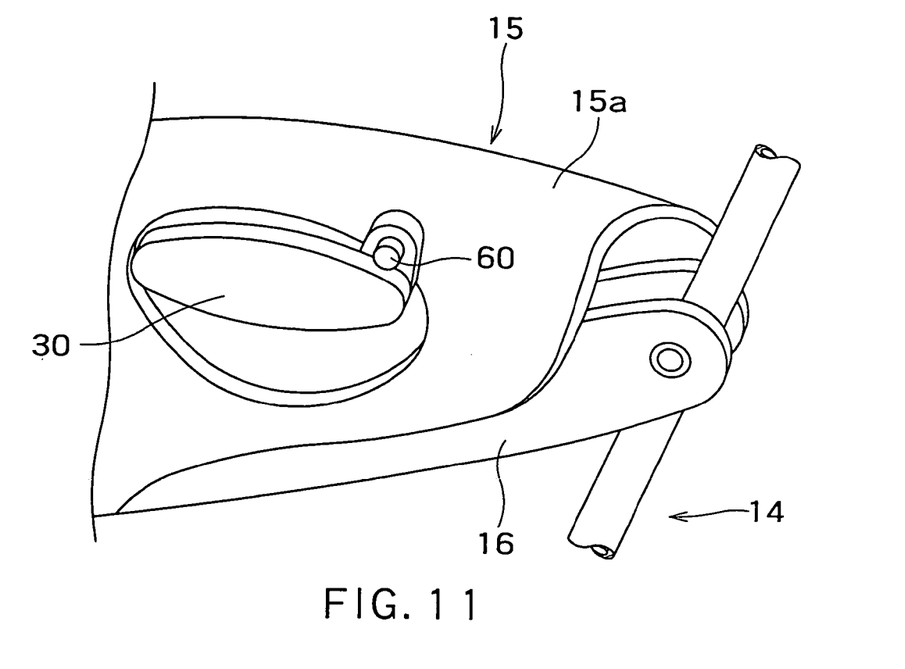
FIG. 11 is a partial view of a child car seat in a second embodiment of the present invention which is attached on a stroller body.
Figure 12:
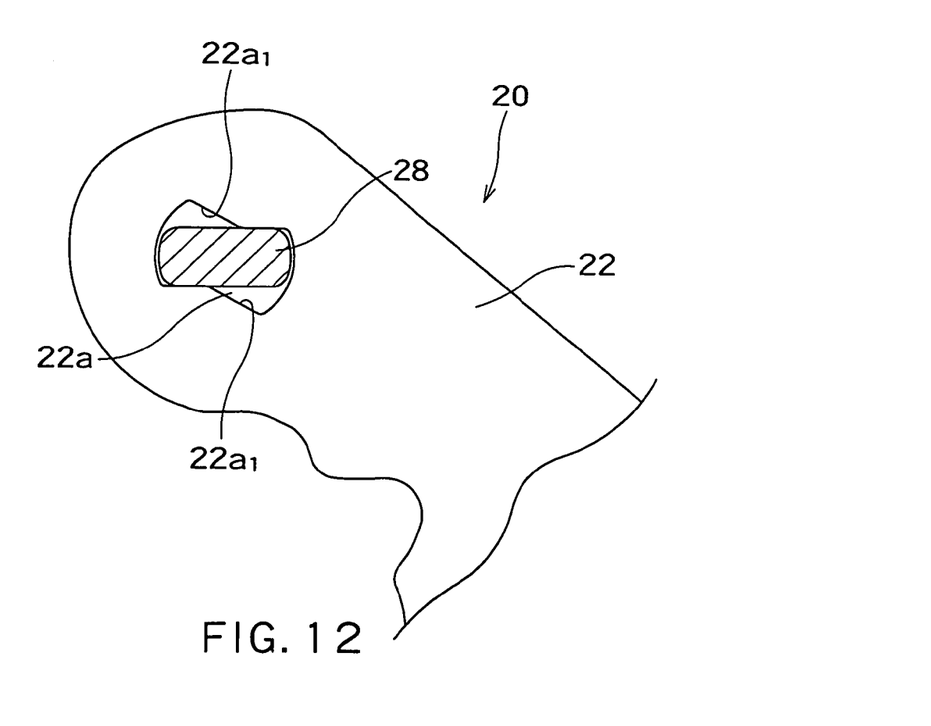
FIG. 12 is an enlarged view of a hole of a locking member into which a stopper shaft is inserted.

The second embodiment shown in FIGS. 11 and 12 has a second locking mechanism 60 for restricting a movement of a detachment lever 30. Other components of the second embodiment are substantially the same as those of the first embodiment.

Thus, the identical components in FIGS. 11 and 12 are represented by the same reference numbers as those of the first embodiment shown in FIGS. 1 to 10, and their detailed description is omitted.

In order to attach a child car seat 15 on a stroller body 14, a lower part of the child car seat 15 is firstly inserted between right and left armrests 16, such that locking mechanisms 20 provided on both sides of the child car seat 15 are respectively inserted from above into the armrests 16 through elongated openings 17 thereof. As the child car seat 15 is moved downward, cutout portions 27a of a protective member 25 and cutout portions 27b of frame plates 21 are fitted to a pin 18 disposed in the armrest 16. Then, a guide surface 22d of a locking member 22 is brought into contact with the pin 18. By means of the guide surface 22d, the locking member 22 is rotated together with a stopper 23 in opposition to a spring force of a spring 32 in a counterclockwise direction in FIG. 5(a). Then a locking claw 22c is moved away from the cutout portions 27a and 27b, and the cutout portions 27b of the frame plates 21 are engaged with the pin 18 disposed in the armrest 16.

After the cutout portions 27b of the frame plates 21 are engaged with the pin 18, the locking member 22 together with the stopper 23 is rotated clockwise by means of a spring force of the spring 32. Then, a recessed portion 22b is engaged with a shaft 31, and the locking claw 22c is engaged with a lower part of the pin 18. Finally, a stopper unlocking operation part 24d of a stopper unlocking member 24 is engaged with the lower part of the pin 18. In this manner, the child car seat 15 is locked in position (FIG. 5(b)).

On the other hand, in order to detach the child car seat 15 from the stroller body 14, the detachment lever 30 is firstly rotated counterclockwise in FIG. 3. Then, the locking member 22 is rotated counterclockwise, so that the locking claw 22c is moved to the unlocked position shown in FIG. 5(a). Simultaneously with the rotation of the locking member 22 to the unlocked position, the stopper 23 is rotated counterclockwise about a stopper shaft 28, and the stopper unlocking member 24 is rotated counterclockwise in FIG. 5(b) by means of a spring force of the spring 32. Then, an engagement projection 24b of the stopper unlocking member 24 is engaged with a stopper staged part 23c of the stopper 23, whereby a further rotation of the locking member 22 is prevented. Thus, the locking member 22 is automatically fixed at the unlocked position (FIG. 5(a)).

In this manner, after a user rotates the detachment lever 30 to the unlocked position and removes his/her hands therefrom, the locking member 22 can be fixed at the unlocked position. Thereafter, simply by moving up the child car seat 15 from the stroller body 14, the child car seat 15 can be detached therefrom.

In the course of moving the child car seat 15 upward, an inclined part 24e of a stopper unlocking operation part 24d is brought into contact with the pin 18, so that the stopper unlocking member 24 is rotated clockwise about the shaft 31 in opposition to a spring force of the spring 32. Then, the engagement projection 24b is disengaged from the stopper staged part 23c, and thus the locking member 22 is no more fixed at the unlocked position. Therefore, the locking member 22 together with the stopper 23 is automatically returned from the unlocked position to the locked position shown in FIG. 5(b) by means of a spring force of the spring 32.

FIG. 11 is a partial view showing the child car seat 15 attached on the armrest 16 of the stroller body 14. The detachment lever 30 of the child car seat 15 is disposed on an outside surface thereof, for rotating the locking member 22 and the stopper 23 simultaneously from the locked position to the unlocked position (FIG. 3). The child car seat 15 further has a second locking button (second locking mechanism) 60 disposed above the detachment lever 30. The second locking button 60 is disposed within a rotational region of the detachment lever 30, and is urged by a spring (not shown) disposed in the child car seat 15 to project therefrom. The second locking button 60 is engaged with the detachment lever 30 to prevent a movement of the detachment lever 30 in the unlocked direction.

Since the second locking button 60 is disposed on the child car seat 15, even when a baby touches the detachment lever 30, or a user's body touches the detachment lever 30 while the child car seat 15 is used as a carrier, the detachment lever 30 can be prevented from being rotated in the unlocked direction.

In order to attach the child car seat 15 on the stroller body 14, the locking member 22 must be rotated in the unlocked direction so as to be disengaged from the pin 18. However, since the detachment lever 30 for rotating the locking member 22 is prevented from being rotated in the unlocked direction by the second locking button 60, the locking member 22 might not be rotated in the unlocked direction. In this case, in order to attach the child car seat 15 on the stroller body 14, it might be necessary to push the second locking button 60 into the child car seat 15 in opposition to a spring force of the spring so as to disengage the second locking button 60 from the detachment lever 30.

In order to avoid such a troublesome operation, however, in the present invention, the locking member 22 has a hole 22a to which a stopper shaft 28 is inserted. As shown in FIG. 12, the hole 22a has parts $22a_1$ each having a shape of scalloping which allow the locking member 22 to be rotated relative to the stopper shaft 28 only in the unlocked direction at an angle, in which the locking claw 22c of the locking member 22 can be disengaged from the pin 18 disposed in the armrest 16 (FIGS. 5(a) and 5(b)).

According to the second embodiment, the child car seat 15 can be attached on the stroller body 14, although a rotation in the unlocked direction of the detachment lever 30 is prevented by the second locking button 60. This is because, when the locking claw 22c of the locking member 22 is brought into contact with the pin 18, the locking member 22 in the unlocked direction can be rotated at an angle in which the locking claw 22c of the locking member 22 can be disengaged from the pin 18 disposed in the armrest 16. Consequently, the locking mechanism 20 in the second embodiment can have an improved operability in that it is unnecessary to push the second locking button 60 each time the child car seat 15 is attached on the stroller body 14.

Third Embodiment

A child car seat securing apparatus in a third embodiment of the present invention will be described below with reference to FIGS. 13 and 14. A child car seat securing apparatus is arranged in an armrest 16 of a stroller body 14. Other components of the third embodiment are substantially the same as those of the first embodiment.

Figure 13:
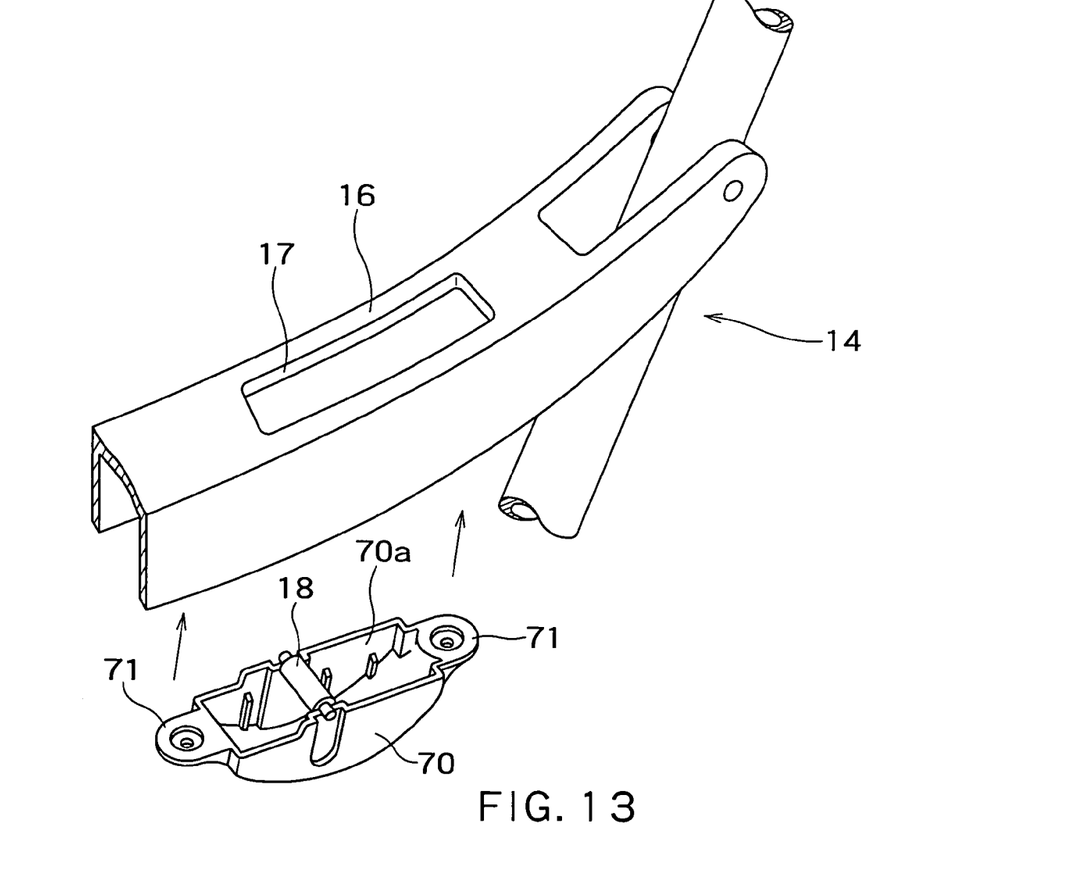
FIG. 13 is an exploded perspective view of a child car seat securing apparatus of a stroller in a third embodiment of the present invention.
Figure 14:
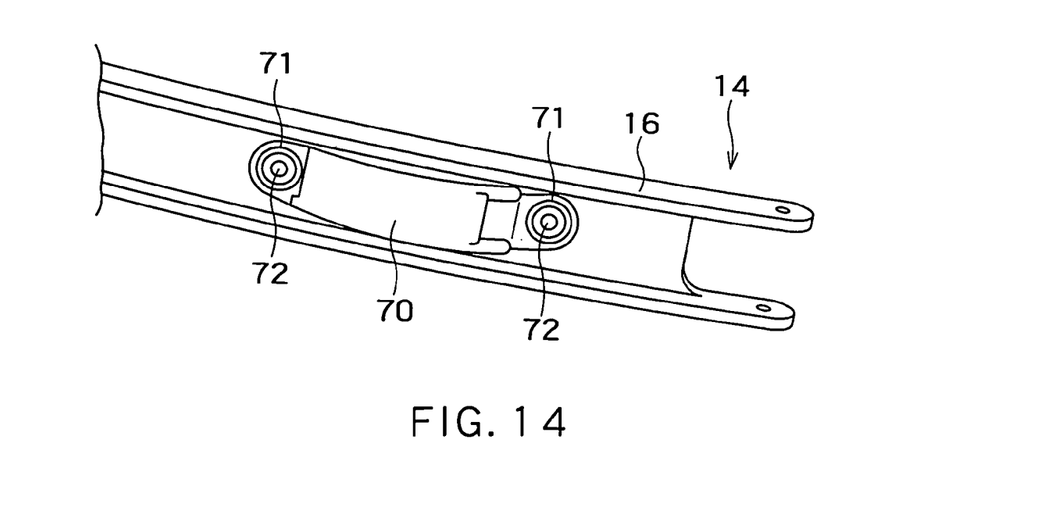
FIG. 14 is a rear view of the secured child car seat securing apparatus.

Thus, the identical components in FIGS. 13 and 14 are represented by the same reference numbers as those of the first embodiment shown in FIGS. 1 to 10, and their detailed description is omitted.

FIG. 13 is an exploded perspective view of the child car seat securing apparatus which includes an enclosure 70, and a pin 18 for securing a child car seat, which is disposed on an upper center part of the enclosure 70. A flange portion 71 is integrally formed with the enclosure 70 at front and rear edges thereof. As shown in FIG. 14, the flange portion 71 is secured on a rear surface of the armrest 16 of the stroller body 14 by a screw.

The pin 18 disposed in the armrest 16 of the stroller body 14 is engaged with a locking mechanism 20 of a child car seat 15 (FIGS. 1 to 5).

According to the third embodiment, the pin 18 with which the locking mechanism 20 of the child car seat 15 is engaged is contained in the enclosure 70. The enclosure 70 is attached to the armrest 16, with the flange portion 71 being secured on the inner surface of the armrest 16 by a screw. Since the pin 18 is not exposed outside the armrest 16, an attractive appearance of the stroller body 14 can be provided.

The armrest 16 has an elongated opening 17, while the enclosure 70 has an upper opening 70a substantially corresponding to the elongated opening 17. The flange portion 71 is formed at a periphery of the upper opening 70a.

In order to attach the child car seat 15 on the stroller body 14, a lower part of the child car seat 15 is firstly inserted between the right and left armrests 16, such that the locking mechanisms 20 provided on both sides of the child car seat 15 are respectively inserted from above into the armrests 16 through the elongated openings 17 thereof. As the child car seat 15 is moved downward, cutout portions 27a of a protective member 25 and cutout portions 27b of frame plates 21 are fitted to the pin 18 disposed in the armrest 16. Then, a guide surface 22d of a locking member 22 is brought into contact with the pin 18. By means of the guide surface 22d, the locking member 22 is rotated together with a stopper 23 in opposition to a spring force of a spring 32 in a counterclockwise direction in FIG. 5(a). Then a locking claw 22c is moved away from the cutout portions 27a and 27b, and the cutout portions 27b of the frame plates 21 are engaged with the pin 18 disposed in the armrest 16.

After the cutout portions 27b of the frame plates 21 are engaged with the pin 18, the locking member 22 together with the stopper 23 is rotated clockwise by means of a spring force of the spring 32. Then, a recessed portion 22b is engaged with a shaft 31, and the locking claw 22c is engaged with a lower part of the pin 18. Finally, a stopper unlocking operation part 24d of a stopper unlocking member 24 is engaged with the lower part of the pin 18. In this manner, the child car seat 15 is locked in position (FIG. 5(b)).

On the other hand, in order to detach the child car seat 15 from the stroller body 14, the detachment lever 30 is firstly rotated counterclockwise in FIG. 3. Then, the locking member 22 is rotated counterclockwise, so that the locking claw 22c is moved to the unlocked position shown in FIG. 5(a). Simultaneously with the rotation of the locking member 22 to the unlocked position, the stopper 23 is rotated counterclockwise about a stopper shaft 28, and the stopper unlocking member 24 is rotated counterclockwise by means of a spring force of the spring 32. Then, an engagement projection 24b of the stopper unlocking member 24 is engaged with a stopper staged part 23c of the stopper 23, whereby a further rotation of the locking member 22 is prevented. Thus, the locking member 22 is automatically fixed at the unlocked position.

In this manner, after a user rotates the detachment lever 30 to the unlocked position and removes his/her hands therefrom, the locking member 22 can be fixed at the unlocked position. Thereafter, simply by moving up the child car seat 15 from the stroller body 14, the child car seat 15 can be detached therefrom.

In the course of moving the child car seat 15 upward, an inclined part 24e of a stopper unlocking operation part 24d is brought into contact with the pin 18, so that the stopper unlocking member 24 is rotated clockwise about the shaft 31 in opposition to a spring force of the spring 32. Then, the engagement projection 24b is disengaged from the stopper staged part 23c, and thus the locking member 22 is no more fixed at the unlocked position. Therefore, the locking member 22 together with the stopper 23 can be automatically returned from the unlocked position to the locked position shown in FIG. 5(b) by means of a spring force of the spring 32.

The invention claimed is:

1. A locking mechanism provided on a child car seat which is attached on a stroller body including an armrest having therein a pin, comprising:
   a locking member which is rotatably disposed on the child car seat, and is capable of being engaged with the pin disposed in the armrest of the stroller body and disengaged therefrom;
   a stopper which is rotated together with the locking member, and has a stopper staged part; and a stopper unlocking member having an engagement projection capable of being engaged with the stopper staged part of the stopper and disengaged therefrom; wherein the locking member can take a locked position and an unlocked position, the stopper staged part and the engagement projection are engaged with each other to maintain the locking member at the unlocked position, when the child car seat is detached from the stroller body, and one of the stopper staged part and the engagement projection has an inclined surface which is inclined in a direction away from the other, when the stopper staged part and the engagement projection are engaged with each other.

2. The locking mechanism of a child car seat according to claim 1, wherein the locking member and the stopper are coaxially rotated relative to the child car seat, and the stopper unlocking member is arranged in coplanar relationship with the stopper, and is rotatably disposed on the child car seat.

3. The locking mechanism of a child car seat according to claim 1, wherein the locking member and the stopper are arranged adjacent to each other, and the stopper unlocking member is arranged in coplanar relationship with the stopper, and is rotatably disposed on the child car seat.

4. The locking mechanism of a child car seat according to claim 1, wherein a spring is interposed between the stopper and the stopper unlocking member, for urging the stopper and the stopper unlocking member to come close to each other.

5. The locking mechanism of a child car seat according to claim 1, wherein the engagement projection of the stopper unlocking member has an inclined surface which is inclined in a direction away from the stopper staged part, when the stopper staged part and the engagement projection are engaged with each other.

6. The locking mechanism of a child car seat according to claim 1, wherein the stopper staged part of the stopper has an inclined surface which is inclined in a direction away from the engagement projection, when the stopper staged part and the engagement projection are engaged with each other.

* * * * *